United States Patent
Xie

(10) Patent No.: US 9,964,796 B2
(45) Date of Patent: May 8, 2018

(54) LIQUID CRYSTAL DISPLAYS AND THE LIQUID CRYSTAL PANELS THEREOF

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 343 days.

(21) Appl. No.: 14/901,768

(22) PCT Filed: Dec. 18, 2015

(86) PCT No.: PCT/CN2015/097896
§ 371 (c)(1),
(2) Date: Dec. 29, 2015

(87) PCT Pub. No.: WO2017/092079
PCT Pub. Date: Jun. 8, 2017

(65) Prior Publication Data
US 2018/0031908 A1 Feb. 1, 2018

(30) Foreign Application Priority Data
Dec. 1, 2015 (CN) .......................... 2015 1 0870671

(51) Int. Cl.
G02F 1/1343 (2006.01)
G02F 1/1335 (2006.01)

(52) U.S. Cl.
CPC ...... *G02F 1/133514* (2013.01); *G02F 1/1343* (2013.01); *G02F 2001/134381* (2013.01)

(58) Field of Classification Search
CPC ............... G02F 2001/134372; G02F 1/134363
See application file for complete search history.

(56) References Cited

U.S. PATENT DOCUMENTS

2007/0188690 A1 8/2007 Ochiai et al.
2012/0133878 A1 5/2012 Hirakata

FOREIGN PATENT DOCUMENTS

| CN | 2424479 Y | 3/2001 |
|---|---|---|
| CN | 1834749 A | 9/2006 |
| CN | 101126953 A | 6/2010 |

*Primary Examiner* — Phu Vu
(74) *Attorney, Agent, or Firm* — Andrew C. Cheng

(57) ABSTRACT

A liquid crystal display (LCD) and the liquid crystal panel thereof are disclosed. A first electrode and a second electrode are configured on the array substrate and the CF substrate. When the common electrode and the pixel electrode are applied with the voltage, and the first electrode and the second electrode are not applied with the voltage, the liquid crystals aligning along a first direction are controlled to align along a second direction. When the first electrode and the second electrode are applied with the voltage having inversed polarity, and the common electrode and the pixel electrode are not applied with the voltage, the liquid crystals aligning along the second direction are controlled to align along the first direction. In this way, the falling time and the response time may be decreased.

20 Claims, 2 Drawing Sheets

LIQUID CRYSTAL DISPLAYS AND THE LIQUID CRYSTAL PANELS THEREOF

BACKGROUND OF THE INVENTION

1. Field of the Invention

The present disclosure relates to liquid crystal display technology, and more particularly to a liquid crystal panel and a liquid crystal display (LCD) having the same.

2. Discussion of the Related Art

The response time of liquid crystal panels, or LCDs, may include rising time and falling time. The rising time relates to the time period during which the liquid crystal panel transits from a normal black display to a normal white display, and the falling time relates to the time period during which the liquid crystal panel transits from a normal white display to a normal black display. Usually, the normal black display is also called as a dark-state display, and light beams cannot pass through the twisted liquid crystals in this state. The normal white display is also called as a bright-state display, and the light beams may pass through the twisted liquid crystals to the greatest extent.

During the transiting process from the normal black display to the normal white display, the liquid crystals may be twisted due to the forces of the electrical field between the pixel electrode and the common electrode. During the transiting process from the normal white display to the normal black display, the pixel electrode and the common electrode are not applied with the grayscale voltage, and there is no electrical field generated therebetween. The liquid crystals need anchoring forces to align the liquid crystals. However, when the viscosity between the liquid crystals is large or when the LCD is under the low temperature environment, the liquid crystals may be affected by the anchoring forces, which may increase the falling time so as to increase the response time. As a result, Caton phenomenon may occur and the display performance may be affected.

SUMMARY

The object of the invention is to provide a LCD and the liquid crystal panel thereof to decrease the falling time and the response time.

In one aspect, a liquid crystal panel includes: an array substrate, a color filter (CF) substrate opposite to the array substrate, and liquid crystals between the array substrate and the CF substrate, the array substrate is spaced apart from the CF substrate, the array substrate includes at least one pixel electrode, the CF substrate includes at least one common electrode; the array substrate and the CF substrate includes alternately arranged first electrodes and second electrode, and the first electrodes and the second electrodes are spaced apart from each other, the first electrodes on the array substrate correspond to the first electrodes on the CF substrate, the second electrodes on the array substrate correspond to the second electrodes on the CF substrate, the first electrodes and the second electrodes are on the same plane, a first insulation layer is arranged between the pixel electrode and the first electrode and between the pixel electrode and the second electrode, and a second insulation layer is arranged between the common electrode and the first electrode and between the common electrode and the second electrode; when voltages having opposite polarities are applied to the common electrode and the pixel electrode, and the first electrodes and the second electrodes are not applied with the voltage, a first electrical field is formed between the common electrode and the pixel electrode, the first electrical field controls the liquid crystals aligning along a first direction to align along a second direction, wherein the first direction is vertical to the second direction, the liquid crystals are negative liquid crystals, the first electrical field is a vertical electrical field, the second electrical field is a horizontal electrical field, the first direction is a vertical direction, and the second direction is a horizontal direction; and when the voltages having opposite polarities are applied to the first electrodes and the second electrodes, and the common electrodes and the pixel electrodes are not applied with the voltage, a second electrical field is formed between the adjacent first electrode and the second electrode, the second electrical field controls the liquid crystals aligning along the second direction to align along the first direction, wherein a polarity of one of the first electrodes and the second electrodes is the same with the voltage applied toward the pixel electrode, and the other polarity of the first electrodes and the second electrodes is the same with the voltage applied toward the common electrode.

Wherein the common electrode is a transparent electrode layer having a surface-shaped structure, or the common electrode includes a plurality of bar-shaped structures arranged on the surface of the CF substrate.

In another aspect, a liquid crystal panel includes: an array substrate, a color filter (CF) substrate opposite to the array substrate, and liquid crystals between the array substrate and the CF substrate, the array substrate is spaced apart from the CF substrate, the array substrate includes at least one pixel electrode, the CF substrate includes at least one common electrode; the array substrate and the CF substrate includes alternately arranged first electrodes and second electrode, and the first electrodes and the second electrodes are spaced apart from each other, the first electrodes on the array substrate correspond to the first electrodes on the CF substrate, the second electrodes on the array substrate correspond to the second electrodes on the CF substrate; when voltages having opposite polarities are applied to the common electrode and the pixel electrode, and the first electrodes and the second electrodes are not applied with the voltage, a first electrical field is formed between the common electrode and the pixel electrode, the first electrical field controls the liquid crystals aligning along a first direction to align along a second direction, wherein the first direction is vertical to the second direction; and when the voltages having opposite polarities are applied to the first electrodes and the second electrodes, and the common electrodes and the pixel electrodes are not applied with the voltage, a second electrical field is formed between the adjacent first electrode and the second electrode, and the second electrical field controls the liquid crystals aligning along the second direction to align along the first direction.

Wherein the first direction is a vertical direction, and the second direction is a horizontal direction.

Wherein the liquid crystals are negative liquid crystals, the first electrical field is a vertical electrical field, and the second electrical field is a horizontal electrical field.

Wherein the first electrodes and the second electrodes are on the same plane, a first insulation layer is arranged between the pixel electrode and the first electrode and between the pixel electrode and the second electrode and a second insulation layer is arranged between the common electrode and the first electrode and between the common electrode and the second electrode.

Wherein the common electrode is a transparent electrode layer having a surface-shaped structure.

Wherein the common electrode includes a plurality of bar-shaped structures arranged on the surface of the CF substrate.

Wherein a polarity of one of the first electrodes and the second electrodes is the same with the voltage applied toward the pixel electrode, and the other polarity of the first electrodes and the second electrodes is the same with the voltage applied toward the common electrode.

Wherein a dimension of the first voltage is the same with the dimension of the second electrode.

Wherein one of the first electrodes and the second electrodes is made by the same material with the pixel electrode, and the other one of the first electrodes and the second electrodes is made by the same material with the common electrode.

In another aspect, a liquid crystal display (LCD) includes: a liquid crystal panel includes an array substrate, a color filter (CF) substrate opposite to the array substrate, and liquid crystals between the array substrate and the CF substrate, the array substrate is spaced apart from the CF substrate, the array substrate includes at least one pixel electrode, the CF substrate includes at least one common electrode; the array substrate and the CF substrate includes alternately arranged first electrodes and second electrode, and the first electrodes and the second electrodes are spaced apart from each other, the first electrodes on the array substrate correspond to the first electrodes on the CF substrate, the second electrodes on the array substrate correspond to the second electrodes on the CF substrate; when voltages having opposite polarities are applied to the common electrode and the pixel electrode, and the first electrodes and the second electrodes are not applied with the voltage, a first electrical field is formed between the common electrode and the pixel electrode, the first electrical field controls the liquid crystals aligning along a first direction to align along a second direction, wherein the first direction is vertical to the second direction; and when the voltages having opposite polarities are applied to the first electrodes and the second electrodes, and the common electrodes and the pixel electrodes are not applied with the voltage, a second electrical field is formed between the adjacent first electrode and the second electrode, and the second electrical field controls the liquid crystals aligning along the second direction to align along the first direction.

Wherein the first direction is a vertical direction, and the second direction is a horizontal direction.

Wherein the liquid crystals are negative liquid crystals, the first electrical field is a vertical electrical field, and the second electrical field is a horizontal electrical field.

Wherein the first electrodes and the second electrodes are on the same plane, a first insulation layer is arranged between the pixel electrode and the first electrode and between the pixel electrode and the second electrode, and a second insulation layer is arranged between the common electrode and the first electrode and between the common electrode and the second electrode.

Wherein the common electrode is a transparent electrode layer having a surface-shaped structure.

Wherein the common electrode includes a plurality of bar-shaped structures arranged on the surface of the CF substrate.

Wherein a polarity of one of the first electrodes and the second electrodes is the same with the voltage applied toward the pixel electrode, and the other polarity of the first electrodes and the second electrodes is the same with the voltage applied toward the common electrode.

Wherein a dimension of the first voltage is the same with the dimension of the second electrode.

Wherein one of the first electrodes and the second electrodes is made by the same material with the pixel electrode, and the other one of the first electrodes and the second electrodes is made by the same material with the common electrode.

In view of the above, with respect to the LCD and the liquid crystal panel, the first electrode and the second electrode are configured on the array substrate and the CF substrate. When the voltage is applied toward the common electrode and the pixel electrode, and the voltage is not applied toward the first electrode and the second electrode, the liquid crystals aligning along the first direction are controlled to align along the second direction, which is vertical to the first direction. When the voltages having opposite polarities are applied toward the first electrode and the second electrode, and the voltage is not applied to the common electrode and the pixel electrode, the liquid crystals aligning along the second direction are controlled to align along the first direction. During the process of the liquid crystal panel transiting from the normal white display to the normal black display, the non-anchoring forces controlling the alignment of the liquid crystals are the larger forces of the electrical fields, which may decrease the falling time so as to decrease the response time. The fast response time may be maintained even when the viscosity between the liquid crystals 13 is larger or when the liquid crystal panel 10 is under a low temperature environment. This enhances the Caton phenomenon when displaying the images and ensures the display performance.

DETAILED DESCRIPTION OF THE EMBODIMENTS

Embodiments of the invention will now be described more fully hereinafter with reference to the accompanying drawings, in which embodiments of the invention are shown.

Figure 1:
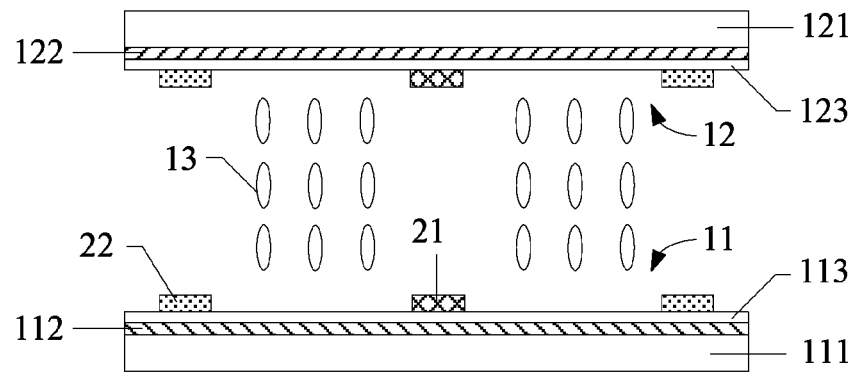
FIG. 1 is a cross-sectional view of the liquid crystal panel in accordance with one embodiment.

FIG. 1 is a cross-sectional view of the liquid crystal panel in accordance with one embodiment. As shown in FIG. 1, the liquid crystal panel 10 includes an array substrate 11, also called as a thin film transistor substrate (TFT) substrate, a color filter (CF) substrate 12, and liquid crystal molecules 13 between the array substrate 11 and the CF substrate 12. The liquid crystal molecules 13 are provided between the liquid crystal cell composited by the array substrate 11 and the CF substrate 12.

The array substrate 11 includes a first transparent base 111 and at least one pixel electrode 112 arranged on the first transparent base 111. The CF substrate 12 includes a second transparent base 121 and at least one common electrode 122 arranged on the second transparent base 121. The common electrode 122 may be a transparent electrode layer having a surface-shaped structure, or a plurality of bar-shaped structures arranged on the surface of the second transparent base 121, and the bar-shaped structures are spaced apart from each other.

The difference between the present disclosure and the conventional technology resides in that: a plurality of first electrodes 21 and second electrodes 22 are arranged on both of the array substrate 11 and the CF substrate 12. The first electrodes 21 and the second electrodes 22 on each of the substrates are on the same plane. In addition, a first insulation layer 113 is arranged between the pixel electrode 112 and the first electrode 21 and between the pixel electrode 112 and the second electrode 22, and a second insulation layer 123 is arranged between the common electrode 122 and between the first electrode 21 and between the common electrode 122 and the second electrode 22. In addition, the first electrodes 21 and the second electrodes 22 are alternately arranged on each of the substrates, and the first electrodes 21 and the second electrodes 22 are spaced apart from each other. The first electrodes 21 on the array substrate 11 correspond to the first electrodes 21 on the CF substrate 12 one by one. The second electrodes 22 on the array substrate 11 correspond to the second electrodes 22 on the CF substrate 12 one by one.

Figure 2:
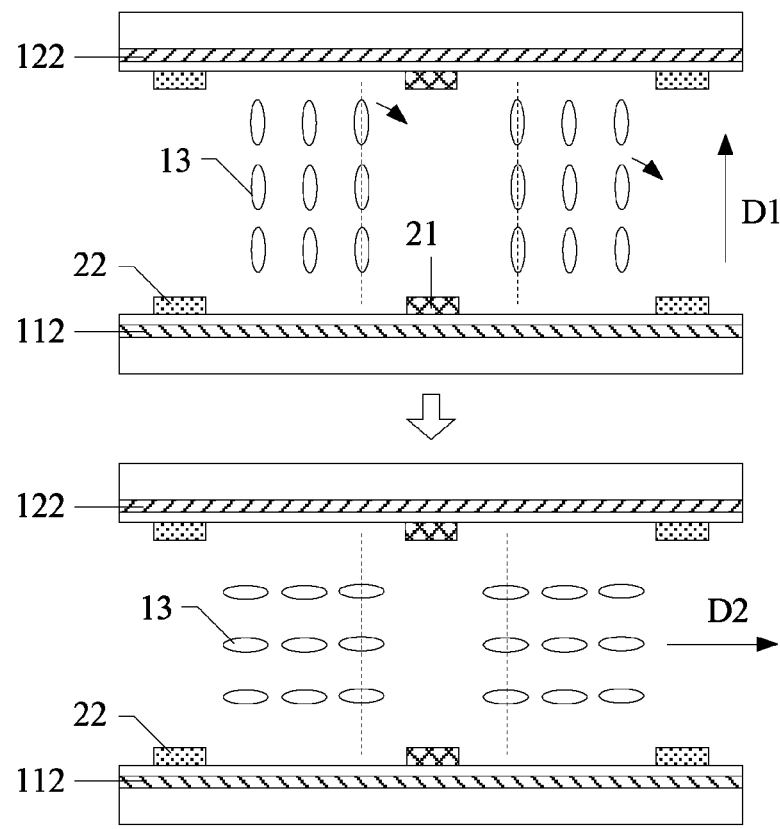
FIG. 2 is a schematic view of the liquid crystal panel FIG. 1 transiting from a normal black display to a normal white display.

Referring to FIG. 2, when the grayscale voltages having opposite polarities are applied to the common electrode 122 and the pixel electrode 112 and the first electrodes 21 and the second electrodes 22 are not applied with the voltage, a first electrical field is formed between the common electrode 122 and the pixel electrode 112, as shown by the dashed line. The forces of the first electrical field controls the liquid crystals 13 align along the direction of the arrow in FIG. 2. In this way, the liquid crystals 13 aligned along the direction of the arrow (D1) are controlled to align along the direction of the arrow (D2). As such, the liquid crystal panel 10 transits from the normal black display to the normal white display.

Figure 3:
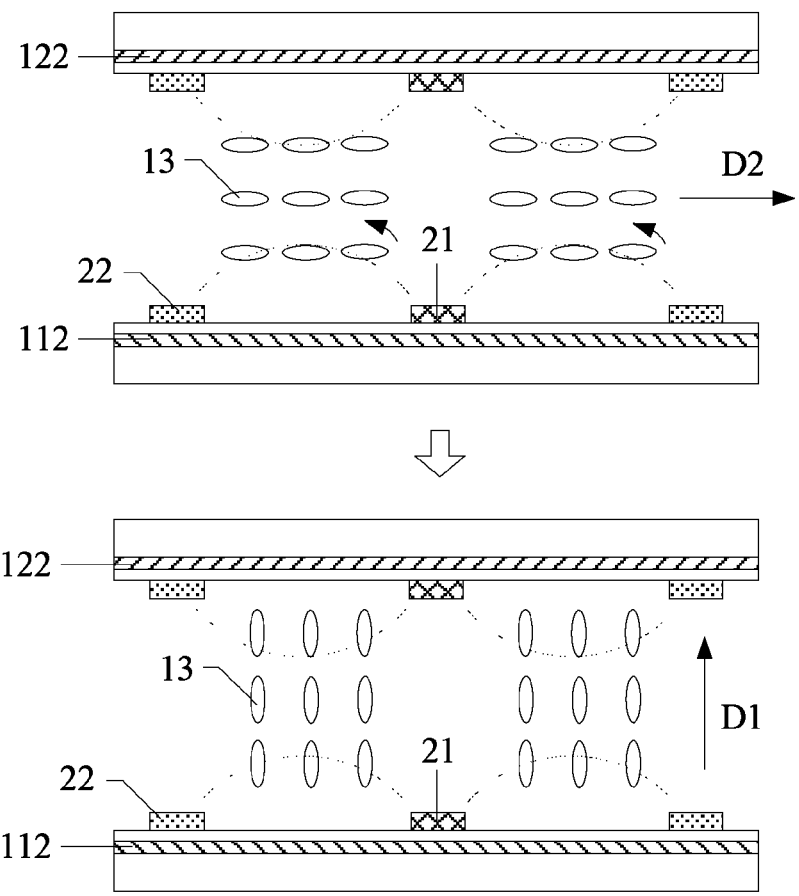
FIG. 3 is a schematic view of the liquid crystal panel FIG. 1 transiting from a normal white display to a normal black display.

Also referring to FIG. 3, when the grayscale voltages having opposite polarities are applied to the first electrodes 21 and the second electrodes 22, and the common electrode 122 and the pixel electrode 112 are not applied with voltage, a second electrical field is formed between the adjacent first electrodes 21 and the second electrodes 22, as shown by the dashed line. The forces of the second electrical fields control the liquid crystals 13 to align along the direction of the arrow in FIG. 3. In this way, the liquid crystals 13 aligned along the direction of the arrow (D2) are controlled to align along the direction of the arrow (D1). As such, the liquid crystal panel 10 transits from the normal white display to the normal black display.

Wherein the first direction (D1) is perpendicular to the second direction (D2). With respect to the liquid crystal panel 10 of vertical alignment (VA) mode, the liquid crystals 13 are of negative attribute. As the alignment of the liquid crystals 13 has to be vertical to the direction of the forces of the electrical fields, the first direction (D1) is a vertical direction, and the second direction (D2) is a horizontal direction. The first electrical field is a vertical electrical field, and the second electrical field is a horizontal electrical field.

In the embodiment, during the process of the liquid crystal panel 10 transiting from the normal white display to the normal black display, the non-anchoring forces controlling the alignment of the liquid crystals 13 are the larger forces of the electrical fields, which may decrease the falling time so as to decrease the response time. The fast response time may be maintained even when the viscosity between the liquid crystals 13 is larger or when the liquid crystal panel 10 is under a low temperature environment. This enhances the Caton phenomenon when displaying the images and ensures the display performance.

In view of the above, the polarity of one of the first electrodes 21 and the second electrodes 22 may be the same with the voltage applied toward the pixel electrode 112, and the polarity of one of the first electrodes 21 and the second electrodes 22 may be the same with the voltage applied toward the common electrode 122. In addition, the dimension of the first electrodes 21 may be the same with that of the second electrodes 22. For instance, the width of the first electrode 21 may be the same with the width of the second electrode 22 along the second direction (D2) of FIG. 1. Further, one of the first electrodes 21 and the second electrodes 22 may be made by the same material with the pixel electrode 112, and the other one may be made by the same material with the common electrode 122. For instance, the first electrodes 21 may be made by the same material with the common electrode 122, and the second electrodes 22 may be made by the same material with the pixel electrode 112. At this moment, the first electrodes 21 may be viewed as the second common electrode, and the common electrode 122 may be viewed as the first common electrode. Similarly, the second electrodes 22 may be viewed as the second pixel electrode, and the pixel electrode 112 may be viewed as the first pixel electrode. As shown in FIG. 2, the liquid crystal panel 10 may be the liquid crystal panel of VA mode. As shown in FIG. 3, the liquid crystal panel 10 may be the liquid crystal panel of In-Plane Switching (IPS) mode.

Figure 4:
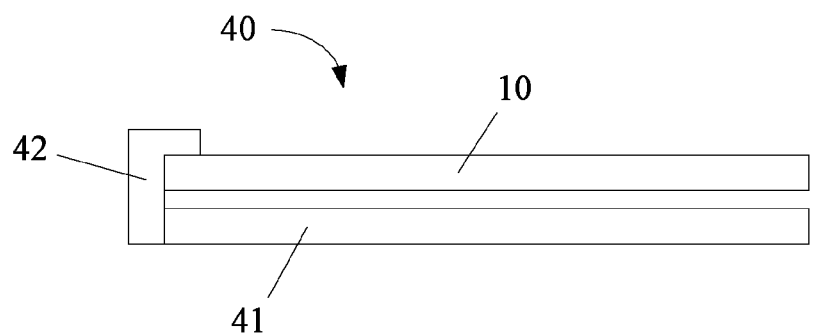
FIG. 4 is a cross-sectional view of the LCD in accordance with one embodiment.

In one embodiment, a LCD 40 is shown in FIG. 4. The LCD 40 includes the liquid crystal panel 10 shown in FIGS. 2 and 3, and other components, such as a backlight module 41, a front frame assembly 42. As the LCD 40 may adopt the configurations of the above liquid crystal panel 10, and thus the LCD 40 owns the same advantages. The LCD 40 may be terminals having a display functions, such as a smart phone, a tablet, a television, a navigator.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal panel, comprising:

an array substrate, a color filter (CF) substrate opposite to the array substrate, and liquid crystals between the array substrate and the CF substrate, the array substrate is spaced apart from the CF substrate, the array substrate comprises at least one pixel electrode, the CF substrate comprises at least one common electrode;

the array substrate and the CF substrate comprise alternately arranged first electrodes and second electrode, and the first electrodes and the second electrodes are spaced apart from each other, the first electrodes on the array substrate correspond to the first electrodes on the CF substrate, the second electrodes on the array substrate correspond to the second electrodes on the CF substrate, the first electrodes and the second electrodes are on the same plane, a first insulation layer is arranged between the pixel electrode and the first electrode and between the pixel electrode and the second electrode, and a second insulation layer is arranged between the common electrode and the first electrode and between the common electrode and the second electrode;

when voltages having opposite polarities are applied to the common electrode and the pixel electrode, and the first electrodes and the second electrodes are not applied with the voltage, a first electrical field is formed between the common electrode and the pixel electrode, the first electrical field controls the liquid crystals aligning along a first direction to align along a second direction, wherein the first direction is vertical to the second direction, the liquid crystals are negative liquid crystals, the first electrical field is a vertical electrical field, the second electrical field is a horizontal electrical field, the first direction is a vertical direction; and when the voltages having opposite polarities are applied to the first electrodes and the second electrodes, and the common electrodes and the pixel electrodes are not applied with the voltage, a second electrical field is formed between the adjacent first electrode and the second electrode, the second electrical field controls the liquid crystals aligning along the second direction to align along the first direction, wherein a polarity of one of the first electrodes and the second electrodes is the same with the voltage applied toward the pixel electrode, and the other polarity of the first electrodes and the second electrodes is the same with the voltage applied toward the common electrode, and the second direction is a horizontal direction.

2. The liquid crystal panel as claimed in claim 1, wherein the common electrode is a transparent electrode layer having a surface-shaped structure, or the common electrode comprises a plurality of bar-shaped structures arranged on the surface of the CF substrate.

3. A liquid crystal panel, comprising:
an array substrate, a color filter (CF) substrate opposite to the array substrate, and liquid crystals between the array substrate and the CF substrate, the array substrate is spaced apart from the CF substrate, the array substrate comprises at least one pixel electrode, the CF substrate comprises at least one common electrode;
the array substrate and the CF substrate comprise alternately arranged first electrodes and second electrode, and the first electrodes and the second electrodes are spaced apart from each other, the first electrodes on the array substrate correspond to the first electrodes on the CF substrate, the second electrodes on the array substrate correspond to the second electrodes on the CF substrate;
when voltages having opposite polarities are applied to the common electrode and the pixel electrode, and the first electrodes and the second electrodes are not applied with the voltage, a first electrical field is formed between the common electrode and the pixel electrode, the first electrical field controls the liquid crystals aligning along a first direction to align along a second direction, wherein the first direction is vertical to the second direction; and
when the voltages having opposite polarities are applied to the first electrodes and the second electrodes, and the common electrodes and the pixel electrodes are not applied with the voltage, a second electrical field is formed between the adjacent first electrode and the second electrode, and the second electrical field controls the liquid crystals aligning along the second direction to align along the first direction.

4. The liquid crystal panel as claimed in claim 3, wherein the first direction is a vertical direction, and the second direction is a horizontal direction.

5. The liquid crystal panel as claimed in claim 4, wherein the liquid crystals are negative liquid crystals, the first electrical field is a vertical electrical field, and the second electrical field is a horizontal electrical field.

6. The liquid crystal panel as claimed in claim 3, wherein the first electrodes and the second electrodes are on the same plane, a first insulation layer is arranged between the pixel electrode and the first electrode and between the pixel electrode and the second electrode, and a second insulation layer is arranged between the common electrode and the first electrode and between the common electrode and the second electrode.

7. The liquid crystal panel as claimed in claim 6, wherein the common electrode is a transparent electrode layer having a surface-shaped structure.

8. The liquid crystal panel as claimed in claim 6, wherein the common electrode comprises a plurality of bar-shaped structures arranged on the surface of the CF substrate.

9. The liquid crystal panel as claimed in claim 3, wherein a polarity of one of the first electrodes and the second electrodes is the same with the voltage applied toward the pixel electrode, and the other polarity of the first electrodes and the second electrodes is the same with the voltage applied toward the common electrode.

10. The liquid crystal panel as claimed in claim 9, wherein a dimension of the first voltage is the same with the dimension of the second electrode.

11. The liquid crystal panel as claimed in claim 3, wherein one of the first electrodes and the second electrodes is made by the same material with the pixel electrode, and the other one of the first electrodes and the second electrodes is made by the same material with the common electrode.

12. A liquid crystal display (LCD), comprising:
a liquid crystal panel comprises an array substrate, a color filter (CF) substrate opposite to the array substrate, and liquid crystals between the array substrate and the CF substrate, the array substrate is spaced apart from the CF substrate, the array substrate comprises at least one pixel electrode, the CF substrate comprises at least one common electrode;
the array substrate and the CF substrate comprises alternately arranged first electrodes and second electrode, and the first electrodes and the second electrodes are spaced apart from each other, the first electrodes on the array substrate correspond to the first electrodes on the CF substrate, the second electrodes on the array substrate correspond to the second electrodes on the CF substrate;
when voltages having opposite polarities are applied to the common electrode and the pixel electrode, and the first electrodes and the second electrodes are not applied with the voltage, a first electrical field is formed between the common electrode and the pixel electrode, the first electrical field controls the liquid crystals aligning along a first direction to align along a second direction, wherein the first direction is vertical to the second direction; and
when the voltages having opposite polarities are applied to the first electrodes and the second electrodes, and the common electrodes and the pixel electrodes are not applied with the voltage, a second electrical field is formed between the adjacent first electrode and the second electrode, and the second electrical field controls the liquid crystals aligning along the second direction to align along the first direction.

13. The LCD as claimed in claim 12, wherein the first direction is a vertical direction, and the second direction is a horizontal direction.

14. The LCD as claimed in claim 13, wherein the liquid crystals are negative liquid crystals, the first electrical field is a vertical electrical field, and the second electrical field is a horizontal electrical field.

15. The LCD as claimed in claim 12, wherein the first electrodes and the second electrodes are on the same plane, a first insulation layer is arranged between the pixel electrode and the first electrode and between the pixel electrode and the second electrode, and a second insulation layer is arranged between the common electrode and the first electrode and between the common electrode and the second electrode.

16. The LCD as claimed in claim 15, wherein the common electrode is a transparent electrode layer having a surface-shaped structure.

17. The LCD as claimed in claim 15, wherein the common electrode comprises a plurality of bar-shaped structures arranged on the surface of the CF substrate.

18. The LCD as claimed in claim 12, wherein a polarity of one of the first electrodes and the second electrodes is the same with the voltage applied toward the pixel electrode, and the other polarity of the first electrodes and the second electrodes is the same with the voltage applied toward the common electrode.

19. The LCD as claimed in claim 18, wherein a dimension of the first voltage is the same with the dimension of the second electrode.

20. The LCD as claimed in claim 18, wherein one of the first electrodes and the second electrodes is made by the same material with the pixel electrode, and the other one of the first electrodes and the second electrodes is made by the same material with the common electrode.

* * * * *